United States Patent
Maliniak et al.

(10) Patent No.: US 11,391,215 B2
(45) Date of Patent: Jul. 19, 2022

(54) SPLINE LEAD IN FEATURE FOR ASSEMBLY AND DAMAGE IMPROVEMENT

(71) Applicant: United Technologies Corporation, Farmington, CT (US)

(72) Inventors: David Maliniak, Guilford, CT (US); Ronald Mazurkiewicz, Jr., Rocky Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 598 days.

(21) Appl. No.: 16/264,052

(22) Filed: Jan. 31, 2019

(65) Prior Publication Data

US 2020/0248629 A1 Aug. 6, 2020

(51) Int. Cl.
| | |
|---|---|
| *F16D 1/06* | (2006.01) |
| *F01D 5/02* | (2006.01) |
| *F02C 7/36* | (2006.01) |
| *F16D 1/10* | (2006.01) |

(52) U.S. Cl.
CPC .............. *F02C 7/36* (2013.01); *F01D 5/026* (2013.01); *F05D 2260/4031* (2013.01); *F16D 2001/103* (2013.01)

(58) Field of Classification Search
CPC .............................. F16D 2001/103; F16D 1/06
USPC ............................................ 403/359.1–359.6
See application file for complete search history.

(56) References Cited

U.S. PATENT DOCUMENTS

| | | | | |
|---|---|---|---|---|
| 3,396,554 A | * | 8/1968 | Westercamp ............ | F16D 3/224 464/143 |
| 4,346,861 A | | 8/1982 | Legrand et al. | |
| 5,503,494 A | * | 4/1996 | Kamata ................. | F16D 1/0858 403/359.6 |
| 8,043,023 B2 | * | 10/2011 | Igarashi ................. | F16D 1/101 403/359.1 |
| 8,783,996 B2 | * | 7/2014 | Kenawy ................. | F16D 1/101 403/359.1 |
| 8,974,140 B2 | * | 3/2015 | Durling ................. | F16D 1/033 403/359.6 |
| 9,297,422 B2 | | 3/2016 | Barnett et al. | |
| 9,834,078 B2 | * | 12/2017 | Isomura ................. | F16H 3/727 |
| 2018/0172078 A1 | | 6/2018 | Vinski et al. | |

FOREIGN PATENT DOCUMENTS

| | | |
|---|---|---|
| DE | 102016200628 | 7/2017 |
| EP | 2505860 | 10/2012 |
| EP | 3508687 | 7/2019 |
| JP | H01279120 | 11/1989 |
| WO | WO 2018/119062 | 6/2018 |

OTHER PUBLICATIONS

European Patent Office, European Search Report dated May 19, 2020 in Application No. 20154069.7.

* cited by examiner

*Primary Examiner* — Justin D Seabe

(74) *Attorney, Agent, or Firm* — Snell & Wilmer L.L.P.

(57) ABSTRACT

A spline assembly includes a shaft having an outer surface with a shaft spline extending along the outer surface. The spline assembly may further include a hub having an inner surface with a hub spline extending along the inner surface and configured to mate with the shaft spline of the shaft. The spline assembly may further include a spline engagement aid configured to be coupled to the shaft and having an aid spline configured to engage with the hub spline to facilitate alignment of the shaft spline relative to the hub spline.

12 Claims, 4 Drawing Sheets

SPLINE LEAD IN FEATURE FOR ASSEMBLY AND DAMAGE IMPROVEMENT

FIELD

The present disclosure relates generally to gas turbine engines and, more particularly, to a spline assembly having a shaft with shaft splines and a hub with hub splines.

BACKGROUND

Gas turbine engines include compressor sections to compress an airflow, combustor sections that combine the airflow with fuel for combustion and generate exhaust, and turbine sections that convert the exhaust into torque to drive the compressor sections. Gas turbine engines may include spline assemblies for coupling together various rotating elements. The spline assemblies may include a shaft having shaft splines and a hub having hub splines and designed to receive the shaft. For example, the shaft may include a low speed spool, and the hub may include a fan hub. In response to rotation of the shaft, the shaft splines may engage with the hub splines, thus resulting in rotation of the hub. Continuing the example, the low speed spool may receive torque from the turbine section, causing rotation of the low speed spool. Rotation of the low speed spool may be transferred to the fan hub via the spline assembly, resulting in rotation of the fan hub and, thus, the fan.

SUMMARY

Described herein is a spline assembly that includes a shaft having an outer surface with a shaft spline extending along the outer surface. The spline assembly may further include a hub having an inner surface with a hub spline extending along the inner surface and configured to mate with the shaft spline of the shaft. The spline assembly may further include a spline engagement aid configured to be coupled to the shaft and having an aid spline configured to engage with the hub spline to facilitate alignment of the shaft spline relative to the hub spline.

In any of the foregoing embodiments, the shaft has a proximate end configured to be received by the hub and a distal end opposite the proximate end; the shaft includes an aid engagement feature extending towards the proximate end from the shaft spline; and the spline engagement aid is configured to be coupled to the aid engagement feature of the shaft.

In any of the foregoing embodiments, the aid engagement feature includes a leading shaft, and the spline engagement aid has an annular shape configured to receive the aid engagement feature.

In any of the foregoing embodiments, the spline engagement aid is configured to be coupled to the aid engagement feature via at least one of a press fit, a bonding, a snap-fit connection, or screw threading.

In any of the foregoing embodiments, the spline engagement aid includes an aid material having less hardness than a shaft material of the shaft and a hub material of the hub.

In any of the foregoing embodiments, the aid material includes a plastic and the shaft material and the hub material include a metal.

In any of the foregoing embodiments, the spline engagement aid includes at least one of a tapered tip, a fillet, or a chamfer.

In any of the foregoing embodiments, the tapered tip includes a taper of the aid spline.

In any of the foregoing embodiments, the spline assembly is configured for use in a gas turbine engine.

Also disclosed is a spline assembly that includes a shaft having an outer surface with a shaft spline extending along the outer surface, a proximate end, and a distal end opposite the proximate end. The spline assembly may further include a hub having an inner surface with a hub spline extending along the inner surface and configured to mate with the proximate end of the shaft spline. The spline assembly may further include a spline engagement aid configured to be coupled to the proximate end of the shaft and having an aid spline configured to engage with the hub spline to facilitate alignment of the shaft spline relative to the hub spline.

In any of the foregoing embodiments, the shaft includes an aid engagement feature extending towards the proximate end from the shaft spline; and the spline engagement aid is configured to be coupled to the aid engagement feature of the shaft.

In any of the foregoing embodiments, the aid engagement feature includes a leading shaft, and the spline engagement aid has an annular shape configured to receive the aid engagement feature.

In any of the foregoing embodiments, the spline engagement aid is configured to be coupled to the aid engagement feature via at least one of a press fit, a bonding, a snap-fit connection, or screw threading.

In any of the foregoing embodiments, the spline engagement aid includes an aid material having less hardness than a shaft material of the shaft and a hub material of the hub.

In any of the foregoing embodiments, the aid material includes a plastic and the shaft material and the hub material include a metal.

In any of the foregoing embodiments, the spline engagement aid includes at least one of a tapered tip, a fillet, or a chamfer.

In any of the foregoing embodiments, the tapered tip includes a taper of the aid spline.

Also disclosed is a gas turbine engine having a compressor section configured to compress air. The gas turbine engine further includes a combustor section configured to combust a mixture of fuel and the compressed air and generate exhaust. The gas turbine engine further includes a turbine section configured to convert the exhaust into torque to drive the compressor section. The gas turbine engine further includes a spline assembly, having: a shaft having an outer surface with a shaft spline extending along the outer surface, a hub having an inner surface with a hub spline extending along the inner surface and configured to mate with the shaft spline of the shaft, and a spline engagement aid configured to be coupled to the shaft and having an aid spline configured to engage with the hub spline to facilitate alignment of the shaft spline relative to the hub spline.

In any of the foregoing embodiments, the shaft has a proximate end configured to be received by the hub and a distal end opposite the proximate end; the shaft includes an aid engagement feature extending towards the proximate end from the shaft spline; and the spline engagement aid is configured to be coupled to the aid engagement feature of the shaft.

In any of the foregoing embodiments, the aid engagement feature includes a leading shaft, and the spline engagement aid has an annular shape configured to receive the aid engagement feature.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
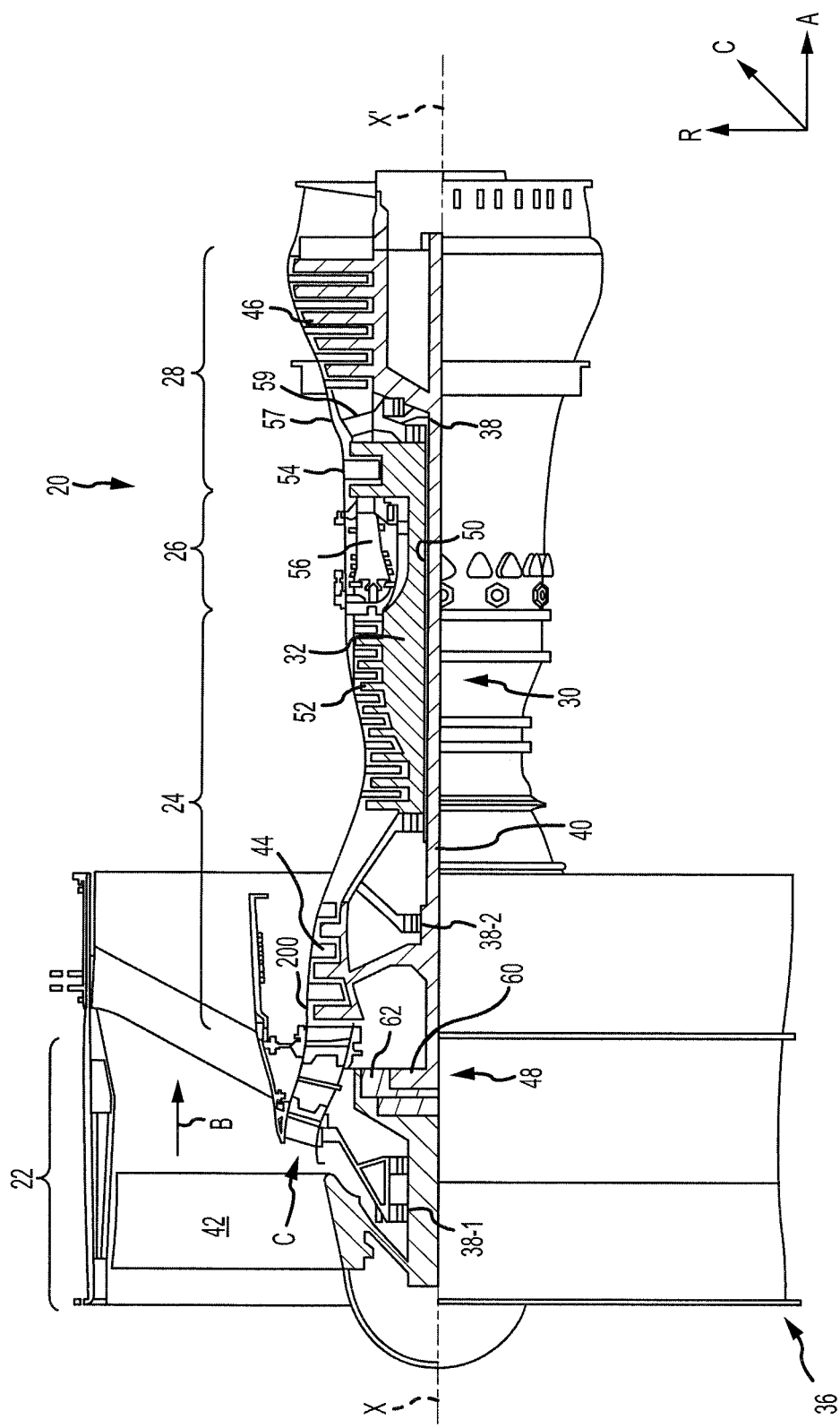
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures, geared turbofan architectures, and turboshaft or industrial gas turbines with one or more spools.

The gas turbine engine 20 generally comprises a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear diffuser case 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5).

The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 4:
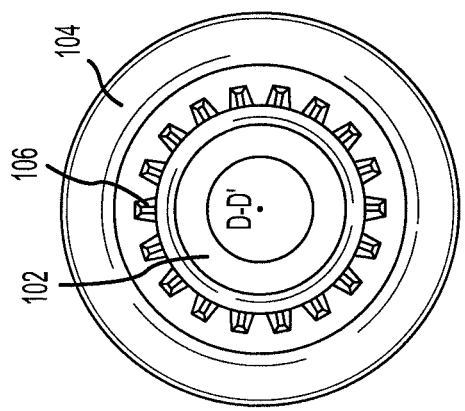
FIG. 4 is an axial view of the spine assembly of FIG. 2, in accordance with various embodiments.
Figure 3:
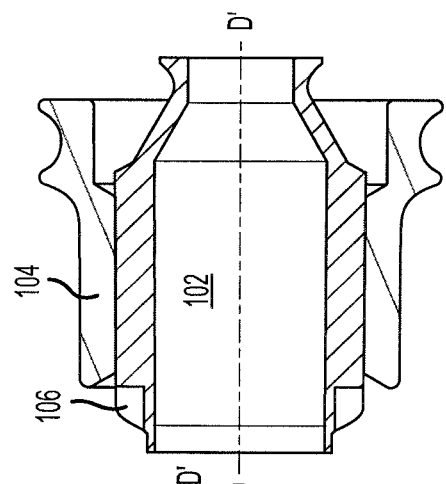
FIG. 3 is a cross-sectional view of the spline assembly of FIG. 2, in accordance with various embodiments.
Figure 2:
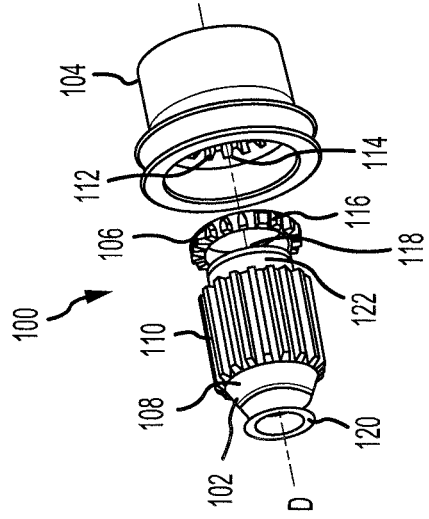
FIG. 2 is an exploded view of a spline assembly for use in a gas turbine engine such as the gas turbine engine of FIG. 1, in accordance with various embodiments.

In various embodiments and referring to FIGS. 2, 3, and 4, a spline assembly 100 is shown. The spline assembly 100 may be used in a gas turbine engine, such as the gas turbine engine 20 of FIG. 1. The spline assembly 100 includes a shaft 102, a hub 104, and a spline engagement aid 106. Where used in this context, a "hub" is located outside of and may at least partially house a "shaft," and a "shaft" may include an element that may be at least partially located within a "hub."

The shaft 102 may have an outer surface 108 having a plurality of shaft splines 110 extending along the outer surface 108. The hub 104 may have an inner surface 112 with a plurality of hub splines 114 extending along the inner surface 112. The shaft 102 may be received by the hub 104, and the shaft splines 110 may engage with the hub splines 114. In that regard, rotation of the shaft 102 may cause rotation of the hub 104 via the engagement of the splines 110, 114. For example, the shaft 102 may be a low turbine shaft, and the hub 104 may be a fan hub, and these components may rotate about an axis D-D'.

Conventional spline assemblies fail to include, for example, a spline engagement aid. In that regard, during assembly of a gas turbine engine, a shaft may be mated with a hub. However, due to difficulties such as low visibility of the installation area, it may be relatively difficult to align shaft splines with hub splines. In that regard, damage may occur to the shaft splines and the hub splines due to undesirable contact therebetween. Additionally, a temperature of the hub may be increased and a temperature of the shaft may be decreased in order to facilitate entry of the shaft into the hub. This provides a relatively short timeframe for insertion of the shaft into the hub (i.e., before the hub cools and the shaft heats) which may result in delays in assembly if alignment of the shaft splines and hub splines is not achieved in a timely manner (due to having to re-heat the hub and re-cool the shaft).

The shaft 102 may have a proximal end 118 and a distal end 120 opposite the proximal end 118. The proximal end 118 may be designed to be initially received by the hub 104. The shaft 102 may include an aid engagement feature 122 on the proximal end 118 to couple the spline engagement aid 106 to the shaft 102. The aid engagement feature 122 may include, for example, a leading shaft which may be an extension of the shaft 102 without the shaft splines 110.

The spline engagement aid 106 may be coupled to the aid engagement feature 122 in a variety of manners. For example, the spline engagement aid 106 may be coupled to the aid engagement feature 122 via a press fit, a bonding, a snap fit, screw threading, a fastener, or the like. The spline engagement aid 106 may be coupled to the shaft 102 in such a manner as to cause the aid splines 116 to align with the shaft splines 110.

In various embodiments, the aid engagement feature 122 may instead be located on the hub 104 and the spline engagement aid 106 may be coupled to the hub 104 rather than the shaft 102. In various embodiments, both of the hub 104 and the shaft 102 may include separate spline engagement aids.

The spline engagement aid 106 may include an aid material having a hardness that is less than a hardness of a shaft material of the shaft 102 and a hub material of the hub 104. In that regard, any potential damage due to alignment of the shaft splines 110 with the hub splines 114 may be reduced or avoided due to contact between the softer aid splines 116 and the hub splines 114 rather than between the shaft splines 110 and the hub splines 114. In response to full insertion of the shaft 102 into the hub 104, the aid splines 116 may fail to contact the hub splines 114, resulting in the aid splines 116 being non-loadbearing.

Figure 5:
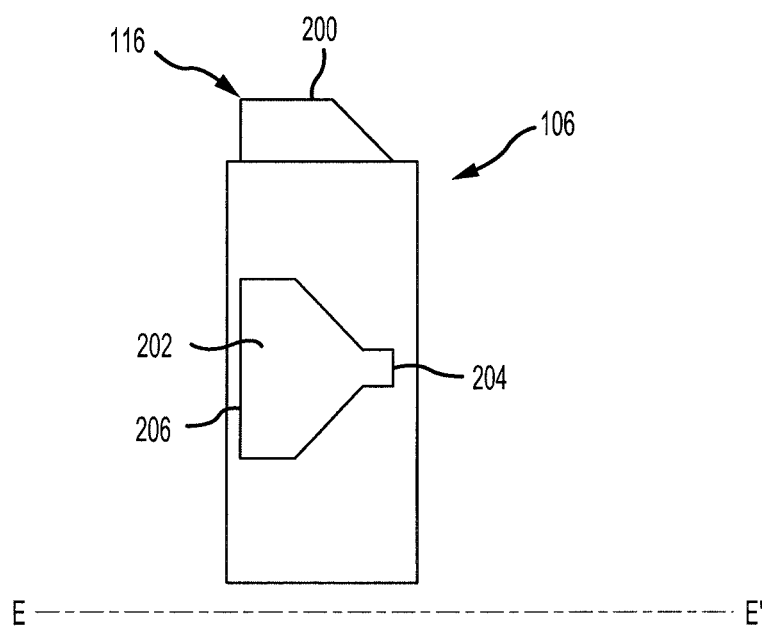
FIG. 5 is an enlarged view of aid splines of a spline engagement aid of the spline assembly of FIG. 2, in accordance with various embodiments.

Referring to FIGS. 2 and 5, the aid splines 116 of the spline engagement aid 106 may have a leading edge 204 designed to be received by the hub 104 first, and a trailing edge 206 opposite the leading edge 204. The aid splines 116 may include features to facilitate alignment of the aid splines 116 with the hub splines 114. For example, the spline engagement aid may include a tapered tip, a fillet, or a chamfer. As shown, the aid splines 116 may include a tapered tip corresponding to a taper of the aid splines 116. In particular, the aid splines 116 may be tapered at least one of towards a center axis E-E' of the spline engagement aid 106 towards the leading edge 204 (as shown in a first spline 200) or tapered inwards towards a point (as shown in a second spline 202).

Figure 6:
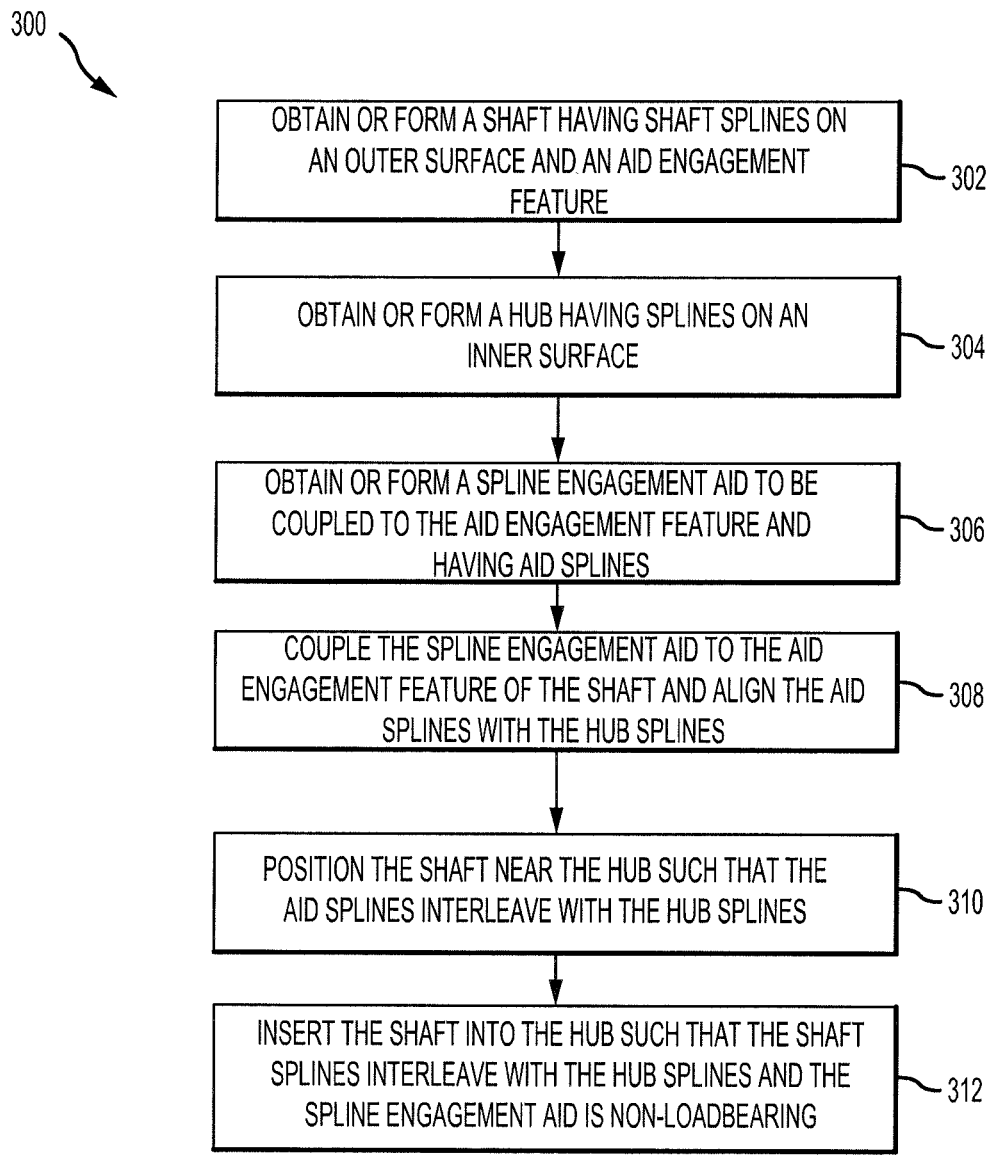
FIG. 6 is a flowchart illustrating a method for assembling a spline assembly, in accordance with various embodiments.

Referring now to FIG. 6, a method 300 for assembling a spline assembly, such as the spline assembly 100 of FIG. 2, is shown. The method 300 may begin in block 302 where a shaft may be obtained or formed. For example, the shaft may be purchased or may be formed using any known method such as additive manufacturing, forging, stamping, or the like. The shaft may include a plurality of shaft splines extending parallel to an axis of the shaft, and the shaft splines may be located on an outer surface of the shaft. The shaft may include a relatively hard material, such as metal. For example, the shaft may include titanium, a titanium-based alloy, nickel, a nickel-based alloy, steel, or the like. The shaft may include an aid engagement feature as well. For example, the aid engagement feature may include a connector of any type, such as a snap-fit connector, a shaft upon which an annular structure may be press fit, or the like. In some embodiments, the aid engagement feature may include a leading shaft upon which the spline engagement aid may be positioned.

In block 304, a hub may be obtained or formed. For example, the hub may be purchased or may be formed using any known method such as additive manufacturing, forging, stamping, or the like. The hub may include a plurality of hub splines extending parallel to an axis of the hub, and the hub splines may be located on an inner surface of the hub. The hub may include a relatively hard material, such as metal. For example, the hub may include titanium, a titanium-based alloy, nickel, a nickel-based alloy, steel, or the like. The hub may include an elongated annular structure upon which the shaft may be inserted.

In block 306, a spline engagement aid may be obtained or formed. For example, the spline engagement aid may be purchased or may be formed using any known method such as additive manufacturing, forging, stamping, or the like. The spline engagement aid may have an annular shape and may include aid splines extending parallel to an axis of the spline engagement aid. The spline engagement aid may be designed to be connected to the aid engagement feature of the shaft. The spline engagement aid may be formed using a material that is less hard than the material of the shaft and the hub. For example, the spline engagement aid may be formed from a soft metal (such as aluminum), plastic, wood, or the like.

In block 308, the spline engagement aid may be coupled to the aid engagement feature of the shaft. For example, a fastener may extend through the spline engagement aid and the aid engagement feature, the spline engagement aid may be coupled to the aid engagement feature via an adhesive, a snap-fit connector may couple the spline engagement aid to the aid engagement feature, the spline engagement aid may be press fit onto the aid engagement feature, or the like. The spline engagement aid may be coupled to the shaft in such a way that the aid splines align with (i.e., are radially aligned with) the shaft splines. In that regard, the shaft splines may be aligned with the hub splines in response to the aid splines being aligned with the hub splines.

In block 310, the shaft may be positioned near the hub such that the aid splines are interleaved with the hub splines. The spline engagement aid may then be pressed through the hub such that the aid splines are interleaved with, and located adjacent to, the hub splines.

In block 312, the shaft may be further inserted into the hub such that the shaft splines are interleaved with, and located adjacent to, the hub splines. The shaft may be further inserted into the hub such that the aid splines are no longer in contact with the hub splines, resulting in the aid splines being non-loadbearing.

Assembling the spline assembly this way provides various advantages. For example, damage to the hub splines and the shaft splines may be reduced or eliminated to the relative soft aid splines of the spline engagement aid. Additionally, assembly time may be reduced due to the aid splines being tapered or otherwise designed to facilitate relatively easy insertion of the aid splines within the hub splines.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A spline assembly, comprising:
   a shaft having an outer surface with a shaft spline extending along the outer surface;
   a hub having an inner surface with a hub spline extending along the inner surface and configured to mate with the shaft spline of the shaft; and
   a spline engagement aid configured to be coupled to the shaft and having an aid spline configured to engage with the hub spline to facilitate alignment of the shaft spline relative to the hub spline,
   wherein:
      the shaft has a proximate end configured to be received by the hub and a distal end opposite the proximate end,
      the shaft includes an aid engagement feature extending from the proximate end of the shaft spline,
      the spline engagement aid is configured to be coupled to the aid engagement feature of the shaft,
      the aid engagement feature includes a leading shaft, and the spline engagement aid has an annular shape configured to circumferentially surround the aid engagement feature, and
      the spline engagement aid is configured to be coupled to the aid engagement feature via at least one of a bonding or a screw threading.

2. The spline assembly of claim 1, wherein the spline engagement aid includes an aid material having less hardness than a shaft material of the shaft and a hub material of the hub.

3. The spline assembly of claim 2, wherein the aid material includes a plastic and the shaft material and the hub material include a metal.

4. The spline assembly of claim 1, wherein the spline engagement aid includes at least one of a tapered tip, a fillet, or a chamfer.

5. The spline assembly of claim 4, wherein the tapered tip includes a taper of the aid spline.

6. The spline assembly of claim 1, wherein the spline assembly is configured for use in a gas turbine engine.

7. A spline assembly, comprising:
a shaft having an outer surface with a shaft spline extending along the outer surface, a proximate end, and a distal end opposite the proximate end;
a hub having an inner surface with a hub spline extending along the inner surface and configured to mate with the proximate end of the shaft spline; and
a spline engagement aid configured to be coupled to the proximate end of the shaft and having an aid spline configured to engage with the hub spline to facilitate alignment of the shaft spline relative to the hub spline, wherein:
the shaft is configured to be received by the hub at the proximate end,
the shaft includes an aid engagement feature extending from the proximate end of the shaft spline,
the spline engagement aid is configured to be coupled to the aid engagement feature of the shaft,
the aid engagement feature includes a leading shaft, and the spline engagement aid has an annular shape configured to circumferentially surround the aid engagement feature, and
the spline engagement aid is configured to be coupled to the aid engagement feature via at least one of a bonding or a screw threading.

8. The spline assembly of claim 7, wherein the spline engagement aid includes an aid material having less hardness than a shaft material of the shaft and a hub material of the hub.

9. The spline assembly of claim 8, wherein the aid material includes a plastic and the shaft material and the hub material include a metal.

10. The spline assembly of claim 7, wherein the spline engagement aid includes at least one of a tapered tip, a fillet, or a chamfer.

11. The spline assembly of claim 10, wherein the tapered tip includes a taper of the aid spline.

12. A gas turbine engine, comprising:
a compressor section configured to generate a compressed air;
a combustor section configured to combust a mixture of fuel and the compressed air and generate exhaust;
a turbine section configured to convert the exhaust into torque to drive the compressor section; and
a spline assembly, having:
a shaft having an outer surface with a shaft spline extending along the outer surface,
a hub having an inner surface with a hub spline extending along the inner surface and configured to mate with the shaft spline of the shaft, and
a spline engagement aid configured to be coupled to the shaft and having an aid spline configured to engage with the hub spline to facilitate alignment of the shaft spline relative to the hub spline,
wherein:
the shaft has a proximate end configured to be received by the hub and a distal end opposite the proximate end,
the shaft includes an aid engagement feature extending from the proximate end of the shaft spline,
the spline engagement aid is configured to be coupled to the aid engagement feature of the shaft,
the aid engagement feature includes a leading shaft, and the spline engagement aid has an annular shape configured to circumferentially surround the aid engagement feature, and
the spline engagement aid is configured to be coupled to the aid engagement feature via at least one of a bonding or a screw threading.

* * * * *